US012761441B2

(12) United States Patent
Jun et al.

(10) Patent No.: US 12,761,441 B2
(45) Date of Patent: Oct. 13, 2026

(54) LASER DEVICE

(71) Applicant: Samsung Display Co., LTD., Yongin-si (KR)

(72) Inventors: Eun Su Jun, Yongin-si (KR); Hak-Min Kim, Yongin-si (KR); Hyoung-Joo Kim, Yongin-si (KR); Yong Geun Lee, Yongin-si (KR); Jong-Hee Lim, Yongin-si (KR); Ilyoung Jeong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 203 days.

(21) Appl. No.: 18/826,652

(22) Filed: Sep. 6, 2024

(65) Prior Publication Data

US 2025/0102760 A1 Mar. 27, 2025

(30) Foreign Application Priority Data

Sep. 22, 2023 (KR) ........................ 10-2023-0127536

(51) Int. Cl.
*G02B 7/02* (2021.01)
*G02B 26/10* (2006.01)

(52) U.S. Cl.
CPC .............. *G02B 7/021* (2013.01); *G02B 26/10* (2013.01)

(58) Field of Classification Search
CPC ................................ G02B 7/021; G02B 26/10
USPC .......................................................... 359/819
See application file for complete search history.

(56) References Cited

U.S. PATENT DOCUMENTS

2024/0227065 A1* 7/2024 Walde ................ B23K 26/0876

FOREIGN PATENT DOCUMENTS

KR 102550517 B1 7/2023

* cited by examiner

*Primary Examiner* — William Choi
(74) *Attorney, Agent, or Firm* — CANTOR COLBURN LLP

(57) ABSTRACT

A laser device includes a laser source which emits a laser beam, a scanner located on a path of the laser beam emitted from the laser source to control the path of the laser beam, a lens module located on a path of a controlled laser beam to converge the laser beam, and a lens adaptor connecting the lens module to the scanner. The lens module includes a first lens part which accommodates a first lens, a second lens part which accommodates a second lens, and a connecting part located between the first lens part and the second lens part, where the connecting part has a longest diameter greater than a longest diameter of the first lens part and a longest diameter of the second lens part.

20 Claims, 16 Drawing Sheets

LASER DEVICE

This application claims priority to Korean Patent Application No. 10-2023-0127536, filed on Sep. 22, 2023, and all the benefits accruing therefrom under 35 U.S.C. § 119, the content of which in its entirety is herein incorporated by reference.

BACKGROUND

1. Field

The disclosure relates to a laser device and more particularly to a laser device used in a cutting process.

2. Description of the Related Art

A laser beam may be used in a manufacturing process of a display device. The laser beam is a high-density heat source and may be used for marking, cutting, welding, heat treatment, or the like. Laser processing has various desired characteristics of being non-contact, causing less wear and allowing fine processing.

The laser device may include a laser source that emits the laser beam, a scanner that controls a radiation position of the laser beam emitted from the laser source, and a lens module that focuses the laser beam whose radiation position has been controlled.

In a laser device where the lens module is fixed to a frame in a cantilever format, a processing position may be distorted due to vibration, and the marking the cutting, the welding, the heat treatment, or the like may be performed at an undesired position. Accordingly, a processing quality of an object to be processed (e.g., a display quality of the display device) may be deteriorate.

SUMMARY

The disclosure relates to a laser device including a large diameter lens.

An embodiment of a laser device includes a laser source which emits a laser beam; a scanner located on a path of the laser beam emitted from the laser source, where the scanner controls the path of the laser beam; a lens module located on a path of a controlled laser beam, where the lens module converges the laser beam; and a lens adaptor connecting the lens module to the scanner. In such an embodiment, the lens module includes a first lens part which accommodates a first lens; a second lens part which accommodates a second lens; and a connecting part located between the first lens part and the second lens part, where the connecting part has a longest diameter greater than a longest diameter of the first lens part and a longest diameter of the second lens part.

In an embodiment, a plurality of first holes and a plurality of second holes spaced apart from the first holes may be defined in the connecting part.

In an embodiment, the laser device may further include a first connector fastened to each of the plurality of first holes, where the first connector may include a ring part.

In an embodiment, the laser device may further include a second connector fastened to each of the plurality of second holes, where the second connector may control a flatness of the lens module.

In an embodiment, the lens adaptor may include a first adaptor movable in a first direction along a first axis; and a second adaptor movable in the first direction along a second axis parallel to the first axis, where a gap between the first adaptor and the second adaptor may be controlled. In such an embodiment, the lens module may be disposed between the first adaptor and the second adaptor.

In an embodiment, the laser device may further include a spacing control member connected to the first axis. In such an embodiment, the spacing control member may move the first adaptor in the first direction based on at least one operating direction thereof.

In an embodiment, the laser device may further include a linear moving member installed on the second adaptor in a direction parallel to the second axis. The second adaptor may move in the first direction along the linear moving member.

In an embodiment, the laser device may further include a support member disposed on the second adaptor. In such an embodiment, the connecting part of the lens module may be seated on the support member.

In an embodiment, the laser device may further include a stopper disposed on a side of the support member. In such an embodiment, the stopper may limit a movement of the lens module in a second direction crossing the first direction.

In an embodiment, the scanner may be connected to the first adaptor, when the first adaptor moves in the first direction, only the scanner may move in the first direction. In such an embodiment, the lens module may be connected to the second adaptor, and when the second adaptor moves in the first direction, only the lens module may move in the first direction.

Another embodiment of a laser device includes a laser source which emits a laser beam; a scanner located on a path of the laser beam emitted from the laser source, where the scanner controls the path of the laser beam; a lens module located on a path of a controlled laser beam, where the lens module converges the laser beam; and a lens adaptor connected to the scanner, where the lens adaptor accommodates the lens module. In such an embodiment, the lens adaptor includes a first adaptor movable in a first direction along a first axis; and a second adaptor movable in the first direction along a second axis parallel to the first axis, where a gap between the first adaptor and the second adaptor is controlled.

In an embodiment, the laser device may further include a spacing control member connected to the first axis. In such an embodiment, the spacing control member may move the first adaptor in the first direction based on at least one operating direction thereof.

In an embodiment, the laser device may further include a linear moving member installed on the second adaptor in a direction parallel to the second axis. The second adaptor may move in the first direction along the linear moving member.

In an embodiment, the lens module may include a first lens part which accommodates a first lens; a second lens part which accommodates a second lens; and a connecting part located between the first lens part and the second lens part, where the connecting part may have a longest diameter greater than a longest diameter of the first lens part and a longest diameter of the second lens part.

In an embodiment, a plurality of first holes and a plurality of second holes spaced apart from the first holes may be defined in the connecting part.

In an embodiment, the laser device may further include a first connector fastened to each of the plurality of first holes, where the first connector may include a ring part.

In an embodiment, the laser device may further include a second connector fastened to each of the plurality of second holes, where the second connector may control a flatness of the lens module.

In an embodiment, the laser device may further include a support member disposed on the second adaptor. In such an embodiment, the connecting part of the lens module may be seated on the support member.

In an embodiment, the laser device may further include a stopper disposed on a side of the support member. In such an embodiment, the stopper may limit a movement of the lens module in a second direction crossing the first direction.

In an embodiment, the scanner may be connected to the first adaptor, when the first adaptor moves in the first direction, only the scanner may move in the first direction. In such an embodiment, the lens module may be connected to the second adaptor, and when the second adaptor moves in the first direction, only the lens module may move in the first direction. As described above, according to embodiments, the laser device may include the scanner, the lens module, and the lens adaptor. The lens module includes the first lens part which accommodates the first lens, the second lens part which accommodates the second lens, and the connecting part located between the first lens part and the second lens part and having the longest diameter greater than the longest diameter of the first lens part and the longest diameter of the second lens part. The lens adaptor may include the first adaptor movable in the first direction along the first axis and the second adaptor movable in the first direction along the second axis parallel to the first axis to control the gap between the first adaptor and the second adaptor. The scanner may be connected to the first adaptor, when the first adaptor moves in the first direction, only the scanner may move in the first direction, the lens module may be connected to the second adaptor, and when the second adaptor moves in the first direction, only the lens module may move in the first direction. Accordingly, installation, replacement, and separation of the lens module may be easily or efficiently performed.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
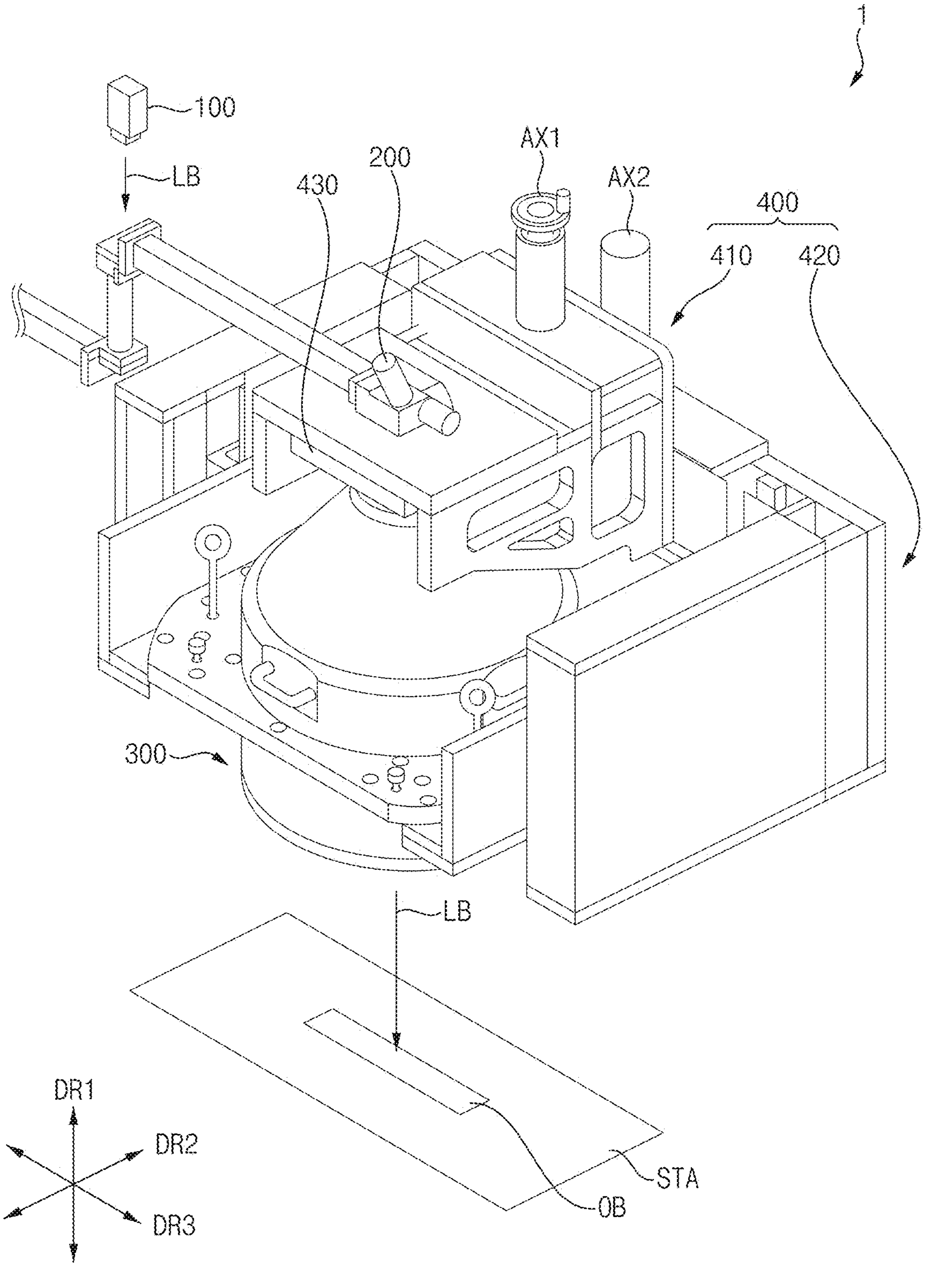
FIG. 1 is a perspective view of a laser device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being “on” another element, it can be directly on the other element or intervening elements may be present therebetween. In contrast, when an element is referred to as being “directly on” another element, there are no intervening elements present.

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. Thus, reference to “an” element in a claim followed by reference to “the” element is inclusive of one element and a plurality of the elements. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The term “lower,” can therefore, encompasses both an orientation of “lower” and “upper,” depending on the particular orientation of the figure. Similarly, if the device in one of the figures is turned over, elements described as “below” or “beneath” other elements would then be oriented “above” the other elements. The terms “below” or “beneath” can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a perspective view of a laser device according to an embodiment of the disclosure.

Referring to FIG. 1, a laser device 1 according to an embodiment of the disclosure may include a laser source 100, a scanner 200, a lens module 300, and a lens adaptor 400. In an embodiment, the laser source 100 may generate a laser beam LB, and emit the laser beam LB to the scanner 200. In an embodiment, for example, the laser source 100 may emit a single beam, or the laser source 100 may emit a multi-beam. In an embodiment, for example, wavelength, amplitude, energy density or the like of the laser beam LB may be controlled according to process.

In an embodiment, the scanner 200 may be located on a path of the laser beam LB emitted from the laser source 100. In an embodiment, for example, the laser beam LB emitted from the laser source 100 may incident to the scanner 200 by traveling straight.

In an embodiment, the scanner 200 may control the path of the laser beam LB. In an embodiment, for example, a traveling direction of the laser beam LB incident on the scanner 200 may be changed toward the lens module 300. In such an embodiment, the scanner 200 may include at least one reflected mirror to change the traveling direction of the laser beam LB incident on the scanner 200. In an embodiment, for example, the scanner 200 may be a galvanometer including two reflected mirrors. However, the disclosure is not limited thereto.

In an embodiment, the lens module 300 may be located on the path of the laser beam LB whose path is controlled by the scanner 200, and the lens module 300 may converse the laser beam LB. In an embodiment, for example, the laser beam LB emitted from the scanner 200 may incident to the lens module 300, and the laser beam LB converged by the lens module 300 may be radiated on an object to be processed object OB on a stage STA.

In an embodiment, for example, the object to be processed OB may be a substrate. In an embodiment, for example, in a case of a manufacturing process of a display device, the object to be processed OB may be a substrate including a glass. In another embodiment, for example, the object to be processed OB may be a substrate including a plastic. However, the disclosure is not limited thereto.

In an embodiment, for example, the lens module 300 may be an F-theta lens unit. The F-theta lens unit may form a focus on a same plane regardless of an incident angle of the laser beam LB. Therefore, in an embodiment where a laser device includes the F-theta lens unit, laser processing may be performed with a same energy regardless of a position at which the laser beam LB is radiated on the object to be processed OB. In an embodiment, for example, the laser processing may be a cutting process. However, the disclosure is not limited thereto.

In an embodiment, for example, the lens module 300 may include a housing and at least one lens accommodated in the housing. A detailed structure of the lens module 300 will be described later with reference to FIGS. 5, 6, and 7.

In an embodiment, the lens adapter 400 may include a first adapter 410 and a second adapter 420. In an embodiment, the lens adapter 400 may connect the lens module 300 to the scanner 200. In such an embodiment, the lens module 300 may be located between the first adapter 410 and the second adapter 420 to connect the lens module 300 to the scanner 200.

The laser device 1 described above with reference to FIG. 1 is illustrative, and the disclosure is not limited thereto. In an embodiment, for example, the laser device 1 may further include various components used for the laser processing.

In an embodiment, for example, the laser device 1 may further include a path conversion member disposed between the laser source 100 and the scanner 200. The path conversion member may change the path of the laser beam LB emitted from the laser source 100.

Figure 2:
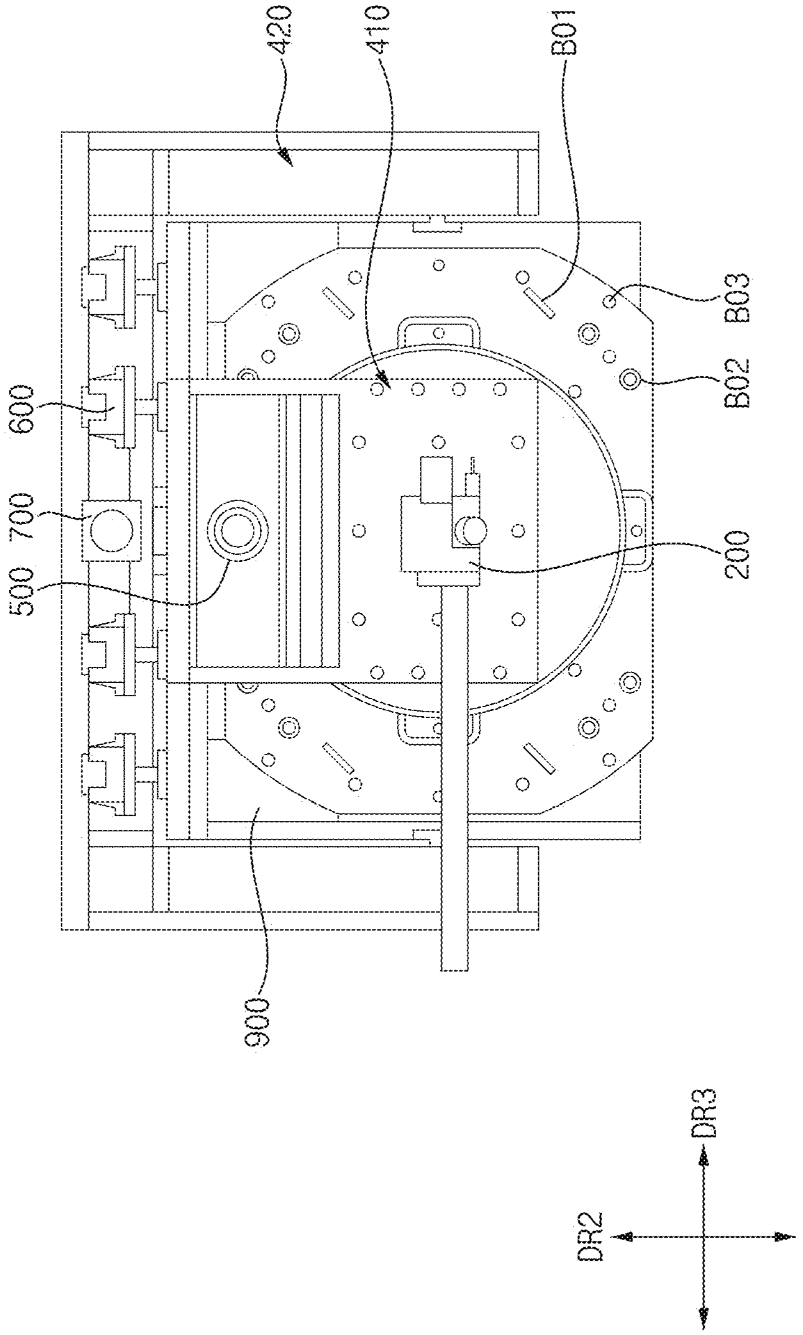
FIG. 2 is a top view of the laser device of FIG. 1.
Figure 3:
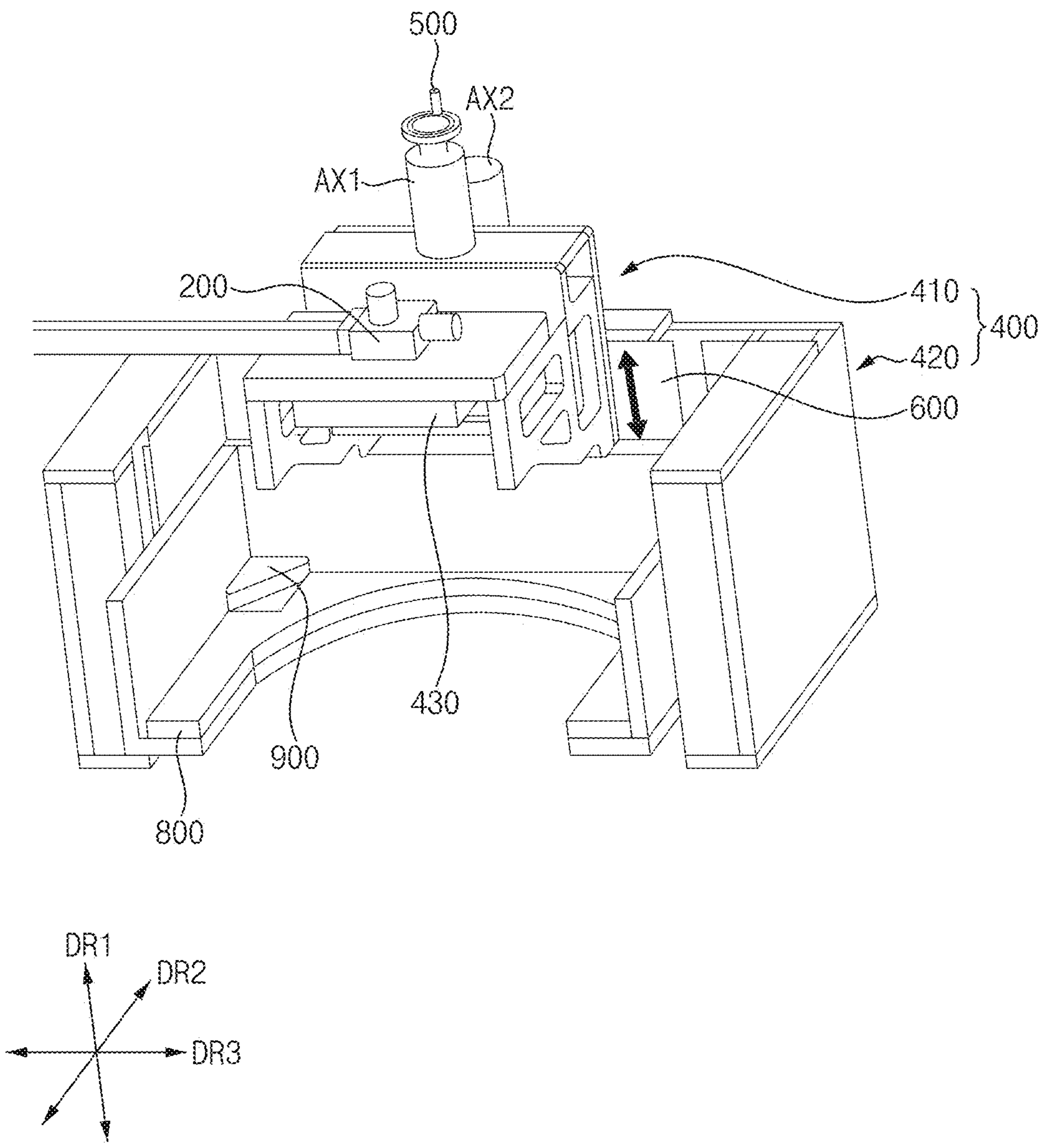
FIGS. 3 and 4 are views illustrating the lens adapter included in the laser device of FIG. 1.
Figure 4:
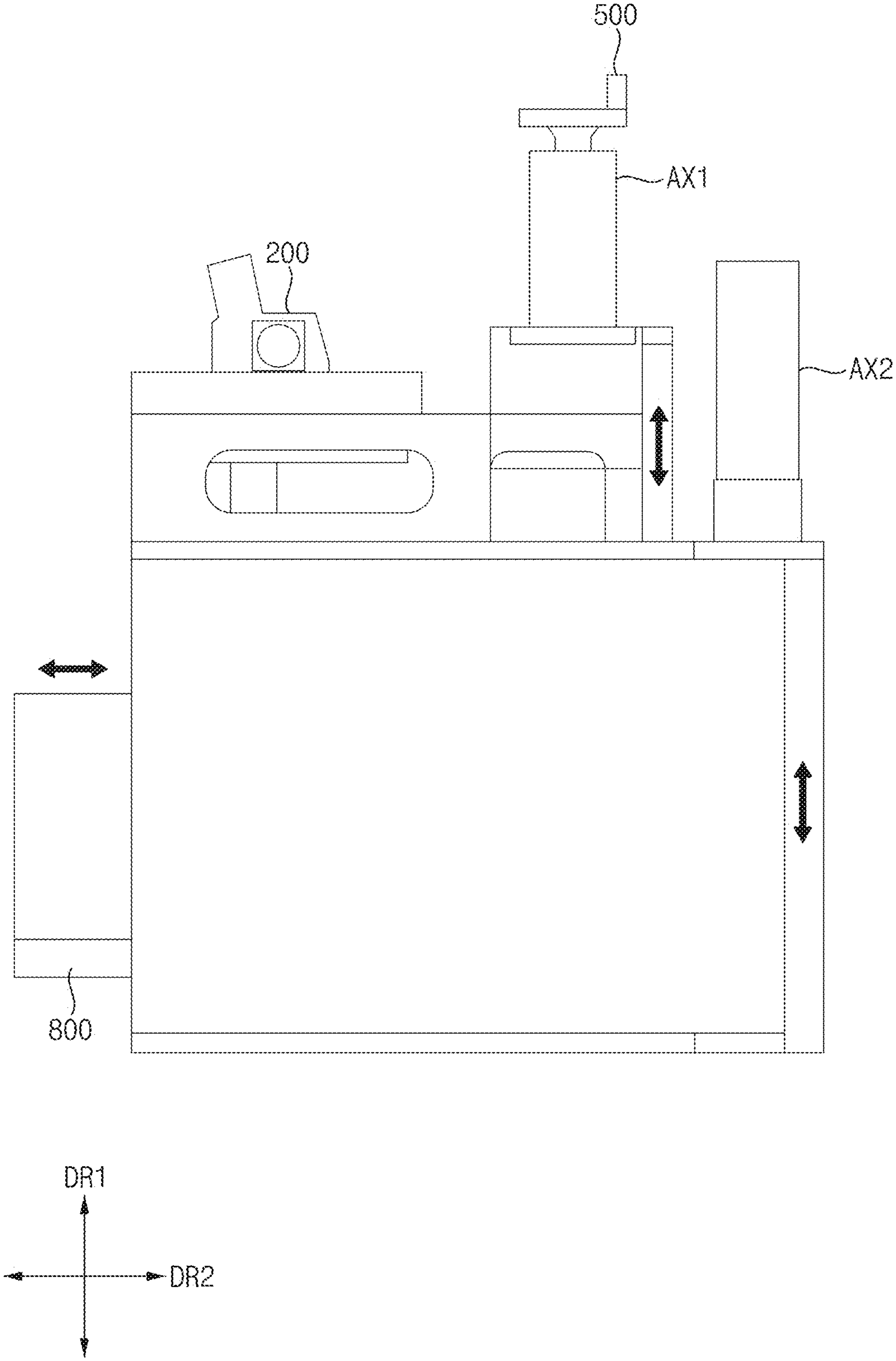

FIG. 2 is a top view of the laser device of FIG. 1. FIGS. 3 and 4 are views illustrating the lens adapter included in the laser device of FIG. 1.

Referring to FIGS. 2, 3, and 4, in an embodiment, the first adapter 410 may move in a first direction DR1 along a first axis AX1, and a second adapter 420 may move in the first direction DR1 along a second axis AX2.

In an embodiment, for example, the first axis AX1 may be located in the first adapter 410, and the second axis AX2 may be located in the second adapter 420. In an embodiment, for example, the first axis AX1 and the second axis AX2 may extend in the first direction DR1.

In an embodiment, for example, the first adapter 410 may move in a direction opposite to a gravity direction along the first axis AX1, and the second adapter 420 may move in the gravity direction along the second axis AX2. In such an embodiment, a gap between the first adapter 410 and the second adapter 420 (e.g., a first separation distance SD of FIG. 15) after the movement may be larger than that before the movement.

In an embodiment, the first adapter 410 may move in the gravity direction along the first axis AX1, and the second adapter 420 may move in the direction opposite to the gravity direction along the second axis AX2. In such an embodiment, the gap between the first adapter 410 and the second adapter 420 (e.g., a second separation distance SD' of FIG. 16) after the movement may be smaller than that before the movement.

In an embodiment, the scanner 200 may be connected to the first adapter 410, and when the first adapter 410 moves in the first direction DR1, only the scanner 200 may move in the first direction DR1. The lens module may be connected to the second adapter 420, and when the second adapter 420 moves in the first direction DR1, only the lens module 300 may move in the first direction DR1.

As the laser device 1 includes the first adapter 410 and the second adapter capable of controlling the gap (e.g., the first separation distance SD of FIG. 15 or the second separation distance SD' of FIG. 16), the scanner 200 and/or the lens module (e.g., the lens module 300 of FIG. 1) may be easily installed (or replaced or the like).

In an embodiment, as shown in FIG. 2, the laser device 1 may further include a spacing control member 500 connected to the first axis AX1. The spacing control member 500 may move the first adapter 410 in the first direction DR1 based on at least one operating direction thereof.

In an embodiment, for example, the spacing control member 500 may be a jog dial. In such an embodiment, when the jog dial is rotated in one direction, the first adapter 410 may move in the direction opposite to the gravity direction. In such an embodiment, when the jog dial is rotated in the direction opposite to the one direction, the first adapter 410 may move in the gravity direction.

In an embodiment, the laser device 1 may further include a linear moving member 600 installed on the second adapter 420 in a direction parallel to the second axis AX2 and a driving member 700 connected to the second axis AX2. In an embodiment, for example, the linear moving member 600 may extend along the first direction DR1. The driving member 700 may move the second adapter 420 along the linear moving member 600 in the first direction DR1.

In an embodiment, for example, the linear moving member 600 may be an LM guide and the driving member 700 may be a motor. In such an embodiment, when the motor rotates in one direction, the second adapter 420 may move in the gravity direction. In such an embodiment, when the motor rotates in a direction opposite to the one direction, the second adapter 420 may move in the direction opposite to the gravity direction. However, the disclosure is not limited to this. A type of the linear moving member 600 and the driving member 700 may be changed in various ways.

Accordingly, the gap between the first adapter 410 and the second adapter 420 included in the laser device 1 may be controlled. However, the disclosure is not limited thereto. In an embodiment, for example, the first adapter 410 may be operated automatically, and the second adapter 420 may be operated manually.

In an embodiment, as shown in FIG. 3, the laser device 1 may further include a support member 800 disposed on the second adapter 420. The support member 800 may support a central portion of the lens module rather than an edge portion of the lens module. Accordingly, the lens module may be supported more stably. Detailed features of the lens module and the support member 800 will be described later with reference to FIGS. 5, 6, and 7.

In an embodiment, the laser device 1 may further include a stopper 900 disposed on the side of the support member 800. The stopper 900 may limit (e.g., stop or block) a movement of the lens module 300 in the second direction DR2. In an embodiment, for example, when installing the lens module 300 between the first adapter 410 and the second adapter 420, the stopper 900 may be located near an end point of the path along which the lens module 300 moves.

The lens adapter 400 included in the laser device 1 described above with reference to FIGS. 2, 3, and 4 is illustrative, and the disclosure is not limited thereto. For example, the laser device 1 may further include various components required for the laser processing, or some components may be omitted.

In an embodiment, for example, as shown in FIG. 2, the second adapter 420 may have a two tine fork shape ('⊏'-like shape) including a first face, a second face, and a third face that cross each other, and the linear moving member 600 located only on the first side of the adapter 420, however, the disclosure is not limited thereto. A shape of the lens adaptor 400 may be changed variously, and the linear moving member 600 may be installed on the second face and/or the third face not first face, or the linear moving member 600 may be installed on all three sides (the first side, the second side, and the third side).

In an embodiment, as shown in FIG. 3, the support member 800 may have a shape that may accommodate the lens module 300 by cutting into a semicircular shape on a rectangular plate, and the stopper 900 has a triangular shape, however, the disclosure is not limited thereto. A shape of the support member 800 and the stopper 900 may be changed variously. In addition, a size, a position, or the like of the support member 800 and the stopper 900 may be changed variously.

Figure 5:
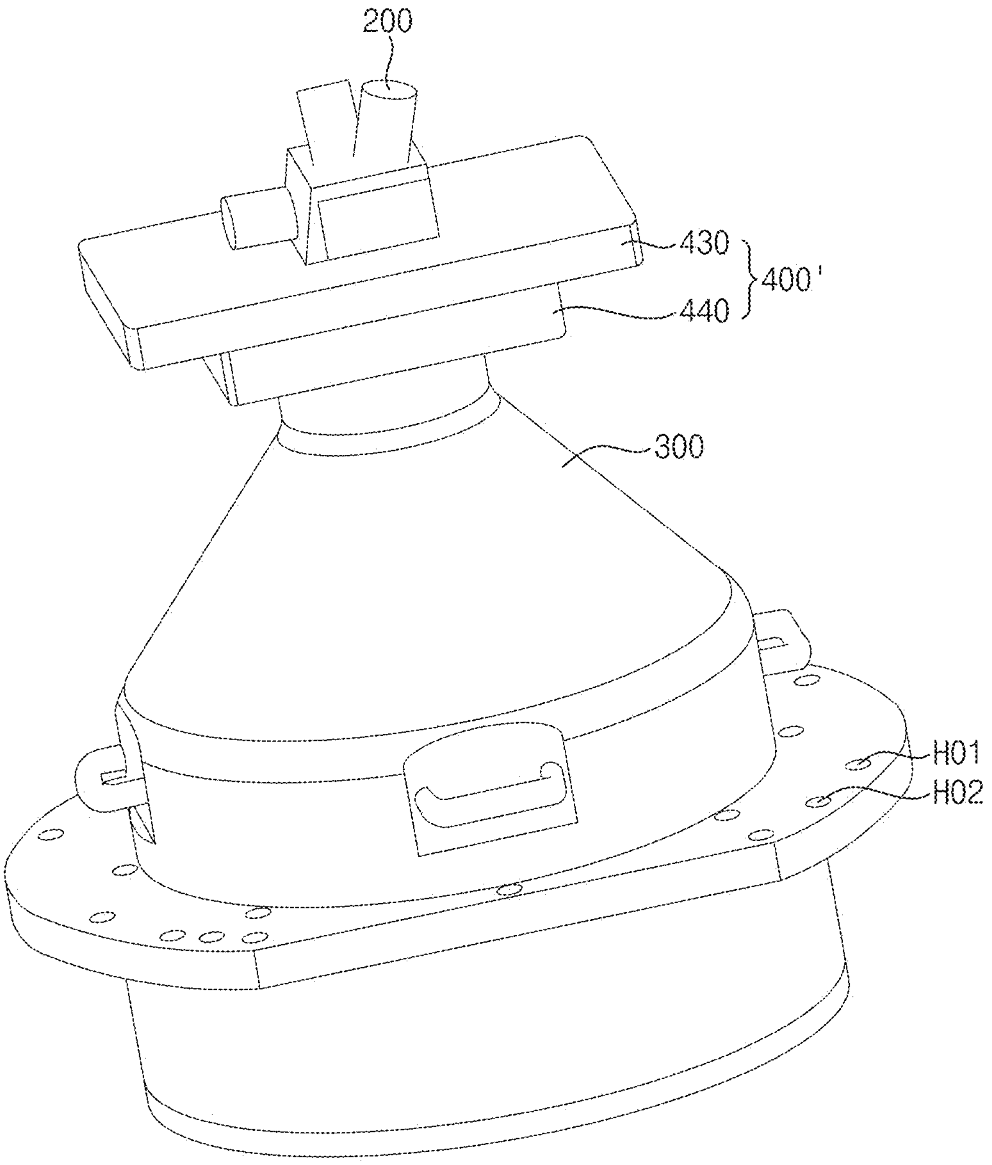
FIGS. 5, 6, and 7 are views the lens module included in the laser device of FIG. 1.
Figure 6:
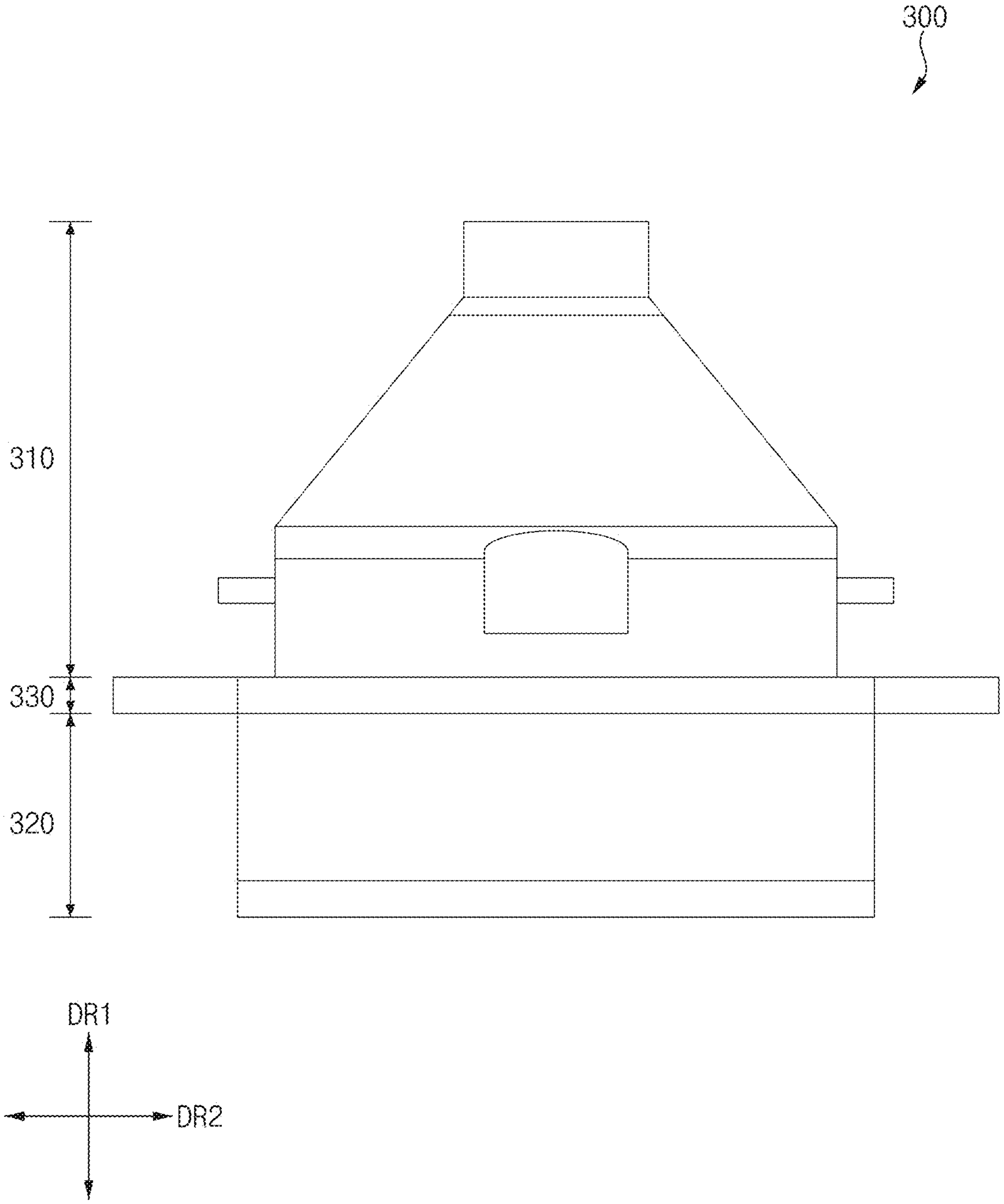
Figure 7:
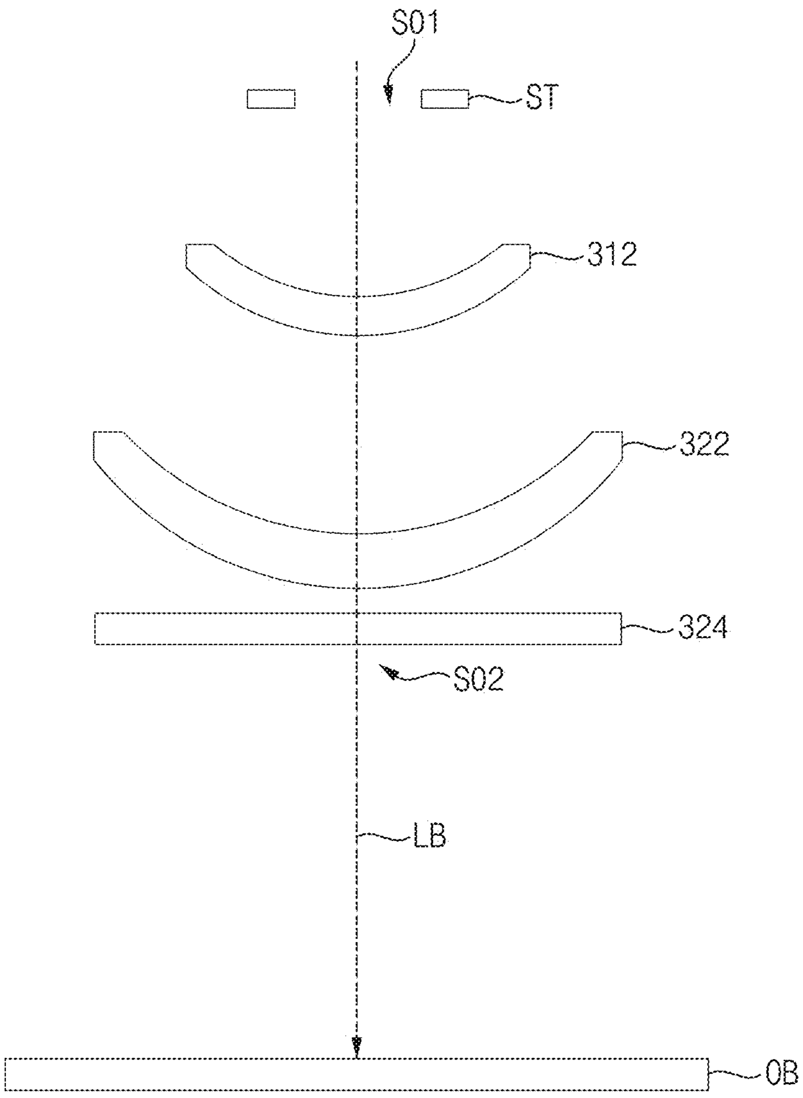
Figure 8:
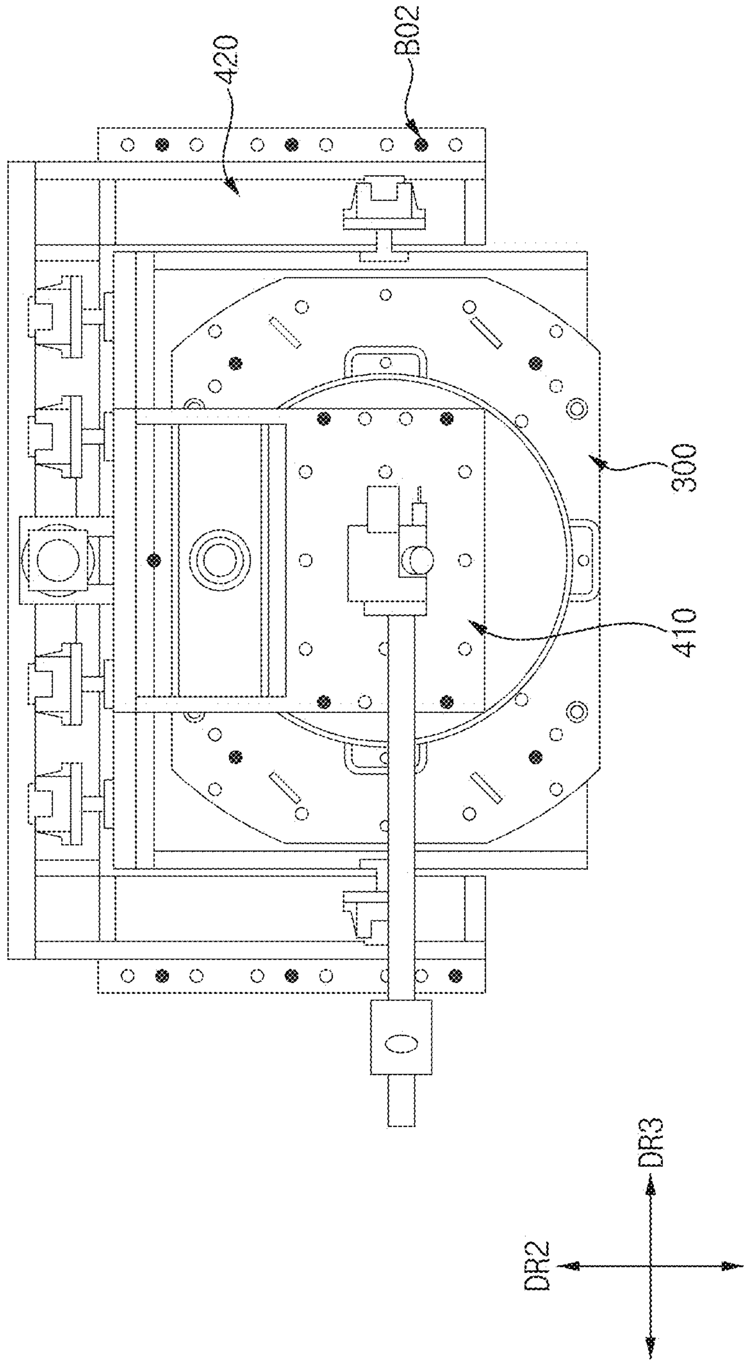
FIG. 8 is a plan view for explaining the second fastening member included in the laser device of FIG. 1.

FIGS. 5, 6, and 7 are views the lens module included in the laser device of FIG. 1. FIG. 8 is a plan view for explaining the second fastening member included in the laser device of FIG. 1.

Referring to FIGS. 2, 5, 6, and 7, for example, an embodiment of the lens module 300 may include the housing and at least one lens accommodated in the housing.

In an embodiment, the lens module 300 may include a first lens part 310, a second lens part 320, and a connecting part 330. In an embodiment, for example, the housing may include the first lens part 310, the second lens part 320, and the connecting part 330.

In an embodiment, for example, the first lens part 310, the second lens part 320, and the connecting part 330 may be formed separately and then assembled. However, the disclosure is not limited thereto. In an embodiment, for example, the first lens part 310 and the connecting part 330 may be integrally formed with each other as a single unitary and indivisible part, and then the second lens part 320 may be coupled to the connecting part 330.

In an embodiment, the first lens part 310 may accommodate a first lens 312, and the second lens part 320 may accommodate a second lens 322. The connecting part 330 may have a longest diameter that is larger than a longest diameter of the first lens part 310 and a longest diameter of the second lens part 320.

In an embodiment, a plurality of first holes HO1 and a plurality of second holes HO2 may be defined in the connecting part 330. The plurality of second holes HO2 may be spaced apart from the plurality of first holes HO1. Each of the plurality of first holes HO1 and the plurality of second holes HO2 may be formed parallel to the path of the laser beam (e.g., the laser beam LB of FIG. 1) incident on the lens module 300.

In an embodiment, the laser device 1 may further include a first connector BO1 that is fastened to each of the plurality of first holes HO1 and includes a ring part. In an embodiment, for example, the first connector BO1 may be an eye-bolt. However, the disclosure is not limited thereto. In embodiments, a type of the first connector BO1 may be changed in various ways.

In an embodiment, the laser device 1 may further include a second connector BO2 that is fastened to each of the plurality of second holes HO2 and controls a flatness of the lens module 300. In an embodiment, for example, the second connector BO2 may be a level adjustment screw. However, the disclosure is not limited thereto. In embodiment, a type of the second connector BO2 may be changed in various ways.

As shown in FIGS. 1, 3, and 6, in an embodiment, the connecting part 330 of the lens module 300 may be seated on the support member 800. In an embodiment, for example, the scanner 200 may be coupled to the first adapter 410 and the lens module 300 may be coupled to the second adapter 420.

Referring to FIGS. 6 and 7, the lens module 300 may include an aperture ST, the first lens 312, the second lens 322, and a window 324. The aperture ST, the first lens 312, the second lens 322, and the window 324 may be sequentially arranged along the traveling direction of the laser beam LB incident on the lens module 300.

Hereinafter, for convenience of description, a side adjacent to the scanner (e.g., scanner 200 of FIG. 1) and onto which the laser beam LB is incident on the lens module 300 will be referred to as a first side S01, a side adjacent to the object to be processed OB and from which the laser beam LB is emitted from the lens module 300 is referred to as a second side S02. In an embodiment, for example, in a direction from the first side S01 to the second side S02, the aperture ST, the first lens 312, the second lens 322, and the window 324 are sequentially arranged.

The aperture ST may be disposed adjacent to the scanner. A diameter of the aperture ST may be designed in various ways depending on the amount of light to be transmitted.

In an embodiment, the first lens 312 and the second lens 322 may have a convex shape in a direction in which the laser beam LB travels. In an embodiment, for example, the first lens 312 and the second lens 322 may have a meniscus shape with a concave surface in the first side S01, or the first lens 312 and the second lens 322 may be spherical on both surfaces opposing the direction in which the laser beam LB travels. However, the disclosure is not limited thereto. In another embodiment, one of the two surfaces of the first lens 312 and the second lens 322 facing in the direction of movement of the laser beam LB may be spherical, and the other surface facing the one surface may be aspherical. In an embodiment, for example, the one surface adjacent to the first side S01 may be a spherical surface, and the other surface adjacent to the second side S02 may be an aspherical surface. In an embodiment, for example, one surface adjacent to the first side S01 may be aspherical, and the other surface adjacent to the second side S02 may be spherical.

In an embodiment, each of the first lens 312 and the second lens 322 may include a material with high light transparency. In an embodiment, for example, each of the first lens 312 and the second lens 322 may include zinc selenide (ZnSe), germanium (Ge), or the like. These may be used alone or in combination with each other. In an embodiment, for example, the first lens 312 may include the zinc selenide, and the second lens 322 may include the germanium. In an embodiment, for example, the first lens 312 may include the germanium, and the second lens 322 may include the zinc selenide. However, the disclosure is not limited thereto. Each of the first lens 312 and the second lens 322 may include various materials.

In an embodiment, as described above, the first lens 312 and the second lens 322 may be the F-theta lenses. However, the disclosure is not limited thereto.

The window 324 may be disposed adjacent to the object to be processed OB. The window 324 may protect the first lens 312 and the second lens 322. Specifically, the window 324 may prevent foreign substances from entering the lens module 300 from the outside of the lens module 300.

In an embodiment, the window 324 may include the material with high light transparency. In an embodiment, for example, the material with high light transparency may include glass, plastic, or the like. These may be used alone or in combination with each other. However, the disclosure is not limited thereto.

The lens module 300 included in the laser device 1 described above with reference to FIGS. 2, 5, 6, and 7 is illustrative, and the disclosure is not limited thereto. In an embodiment, for example, the laser device 1 may further include various components required for the laser processing, or some components may be omitted.

In an embodiment, only the plurality of first holes HO1 and the plurality of second holes HO2 may be defined or formed as shown in FIG. 5, but the disclosure is not limited thereto. In another embodiment, a plurality of third holes may be further defined. The plurality of third holes may be spaced apart from the plurality of first holes HO1 and the plurality of second holes HO2.

In an embodiment, the laser device 1 may further include a third connector BO3 that is fastened to each of the plurality of third holes and couples the lens module 300 to the second adapter 420. In an embodiment, for example, the third connector BO3 may be a female screw with threads formed on its outer peripheral surface. In such an embodiment, each of the plurality of third holes may have a male thread shape that is screwed together with the female thread. However, the disclosure is not limited thereto. In embodiments, a type of the third connector BO3 may be changed in various ways In addition, in FIG. 7, an embodiment where the lens module 300 includes two lenses is shown, but the disclosure is not limited thereto. The lens module 300 may include one lens or three or more lenses.

In an embodiment, a reflective member may be further disposed between the scanner 200 and the lens module 300. The reflective member may control the angle of the laser beam LB incident on the lens module 300 by reflecting the laser beam LB emitted from the scanner 200.

Referring to FIG. 8, the second connector BO2 may be fastened to the first adapter 410, the second adapter 420, and the frame to which the first adapter 410 and the second adapter 420 are fastened.

In an embodiment, for example, the second connector BO2 fastened to the first adapter 410 may control the flatness of the first adapter 410, and the second connector BO2 fastened to the second adapter 420 may control the flatness of the second adapter 420, and the second connector BO2 fastened to the frame may control the flatness of the frame. However, the disclosure is not limited thereto.

In a case of the laser device according to a comparative example, one end of the lens module may be connected to one axis. In this case, load may be concentrated on the one end of the lens module and may be vulnerable to vibration.

In embodiments of the laser device according to the disclosure, the first adapter 410 may be connected to the first axis AX1, the second adapter 420 may be connected to the second axis AX2, the scanner 200 may be coupled to the first adapter 410, and the lens module 300 may be coupled to the second adapter 420. In such embodiments, the lens module 300 may be disposed in a central portion (e.g., the connecting part 330) rather than the one end disposed of the second adapter 420, so that the load may be distributed and the lens module 300 may be robust against vibration.

Figure 9:
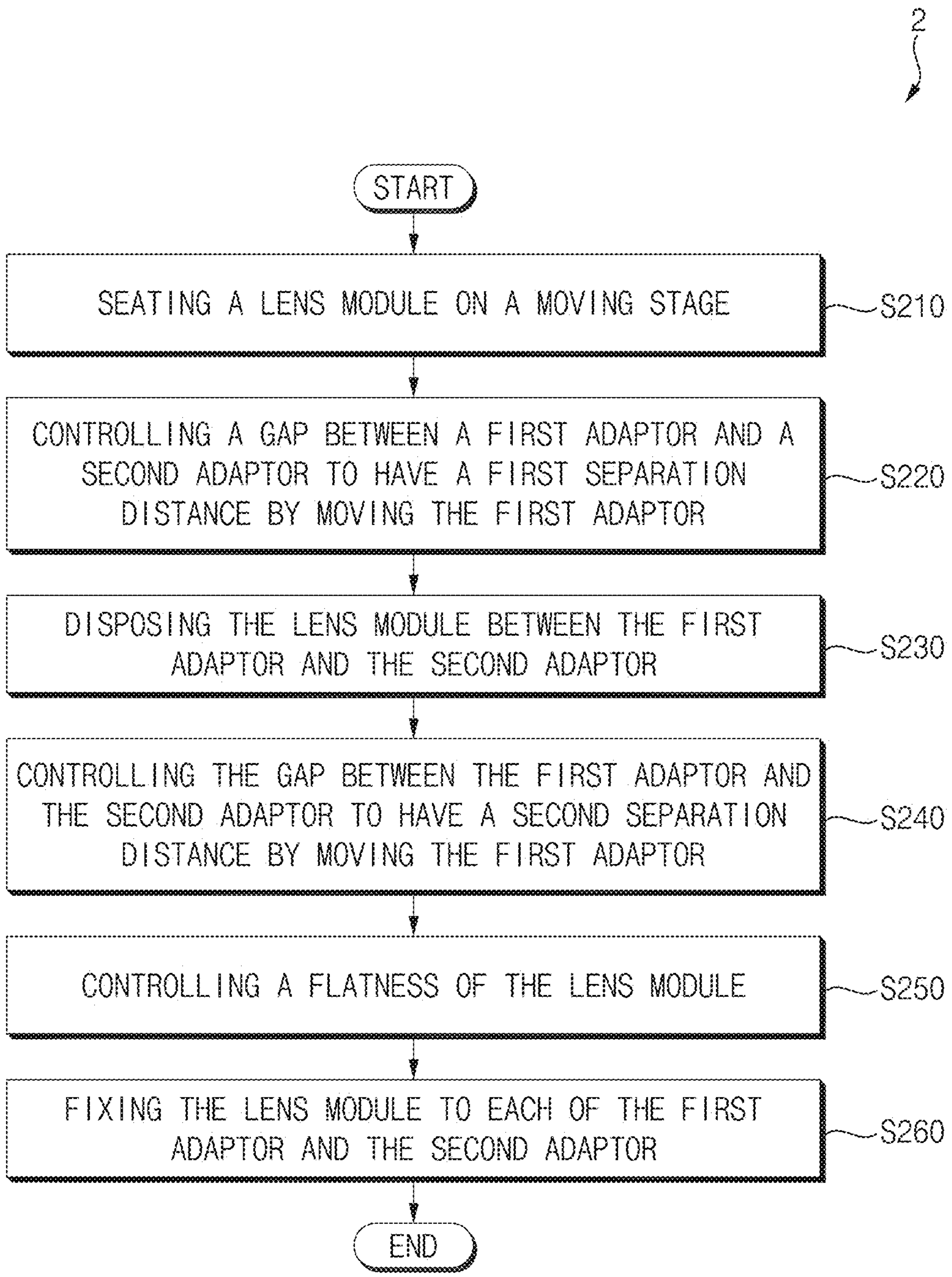
FIG. 9 is a flowchart illustrating a method of disposing the lens module in the laser device according to an embodiment of the disclosure.

FIG. 9 is a flowchart illustrating a method of disposing the lens module in the laser device according to an embodiment of the disclosure. FIGS. 10, 11, 12, and 13 are views illustrating the method of disposing a lens module in the laser device of FIG. 9.

Referring to FIG. 9, a method 2 of disposing the lens module in the laser device (e.g., the lens module 300 in the laser device 1 of FIG. 1) according to an embodiment of the disclosure may include seating the lens module 300 on a moving stage (e.g., a moving stage MS of FIG. 10) (S210), controlling a gap between the first adaptor (e.g., the first adaptor 410 of FIG. 1) and the second adaptor (e.g., the second adaptor 420 of FIG. 1) to have the first separation distance (e.g., the first separation distance SD of FIG. 15) by moving the first adaptor (S220), disposing the lens module between the first adaptor and the second adaptor (S230), controlling the gap between the first adaptor and the second adaptor to have the second separation distance (e.g., the second separation distance SD' of FIG. 16) by moving the first adaptor (S240), controlling the flatness of the lens module (S250), and fixing the lens module to each of the first adaptor and the second adaptor (S260).

Figure 10:
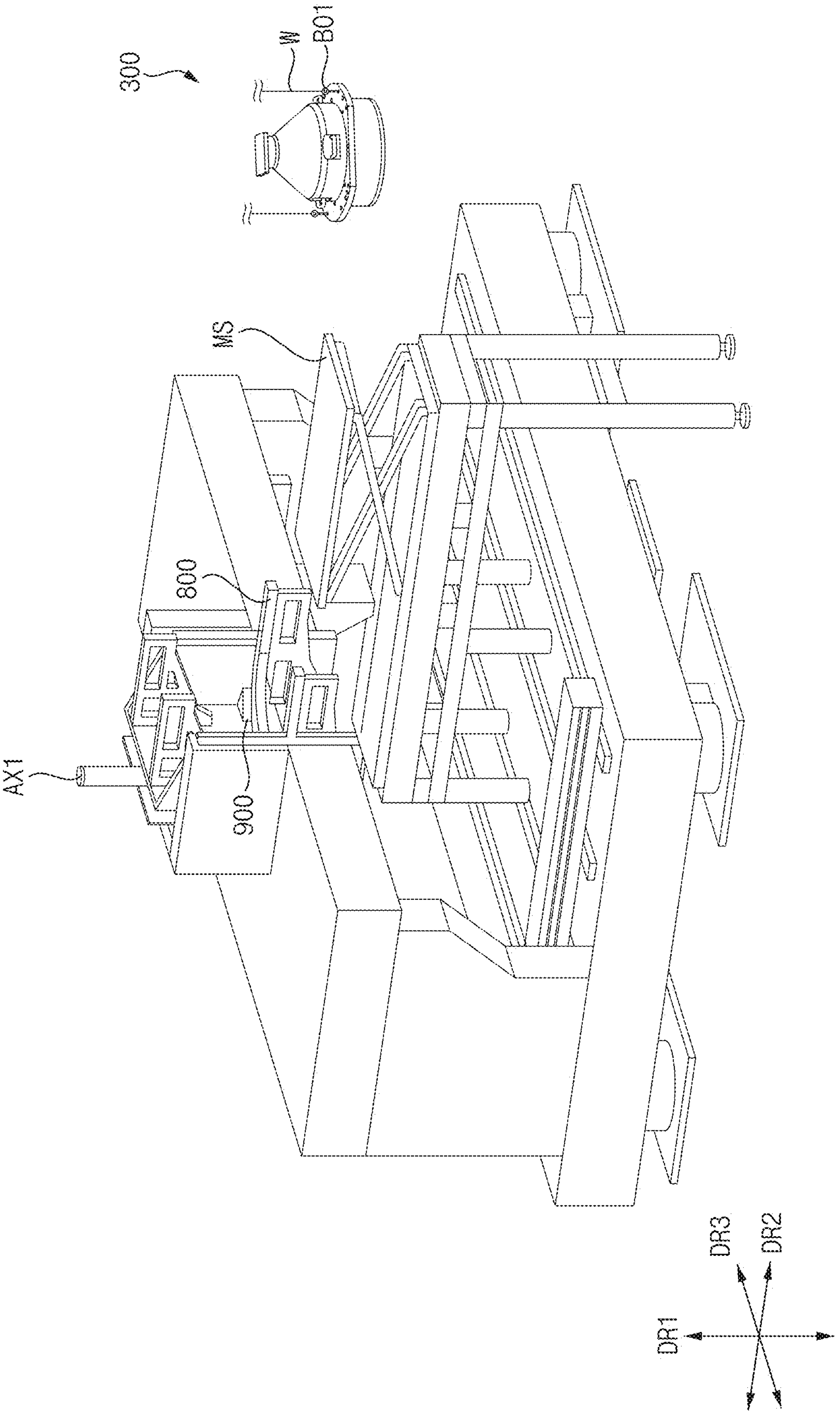
FIGS. 10, 11, 12, and 13 are views illustrating the method of placing a lens module in the laser device of FIG. 9.

Referring to FIG. 10, the lens module 300 may be seated on the moving stage MS.

As described above, in an embodiment, the lens module 300 may include the connecting part (e.g., the connecting part 330 of FIG. 6), the plurality of first holes (e.g., the plurality of first holes HO1 shown in FIG. 5) are defined in the connecting part, and the first connector BO1 may fastened to each of the plurality of first holes.

As described above, in an embodiment, the first fastening connector BO1 may include a ring part. In an embodiment, for example, the first fastening connector BO1 may be the eye bolt.

A wire W may be caught by the ring of the first connector BO1. The lens module 300 may be lifted while the wire W is caught by the ring.

In an embodiment, for example, the moving stage MS may slide along the second direction DR2. The lens module 300 may be seated on the moving stage MS.

In such an embodiment, the lens module 300 may be moved to the moving stage MS while being hung by the wire W, and the lens module 300 may be slid while being seated on the moving stage MS.

Figure 11:
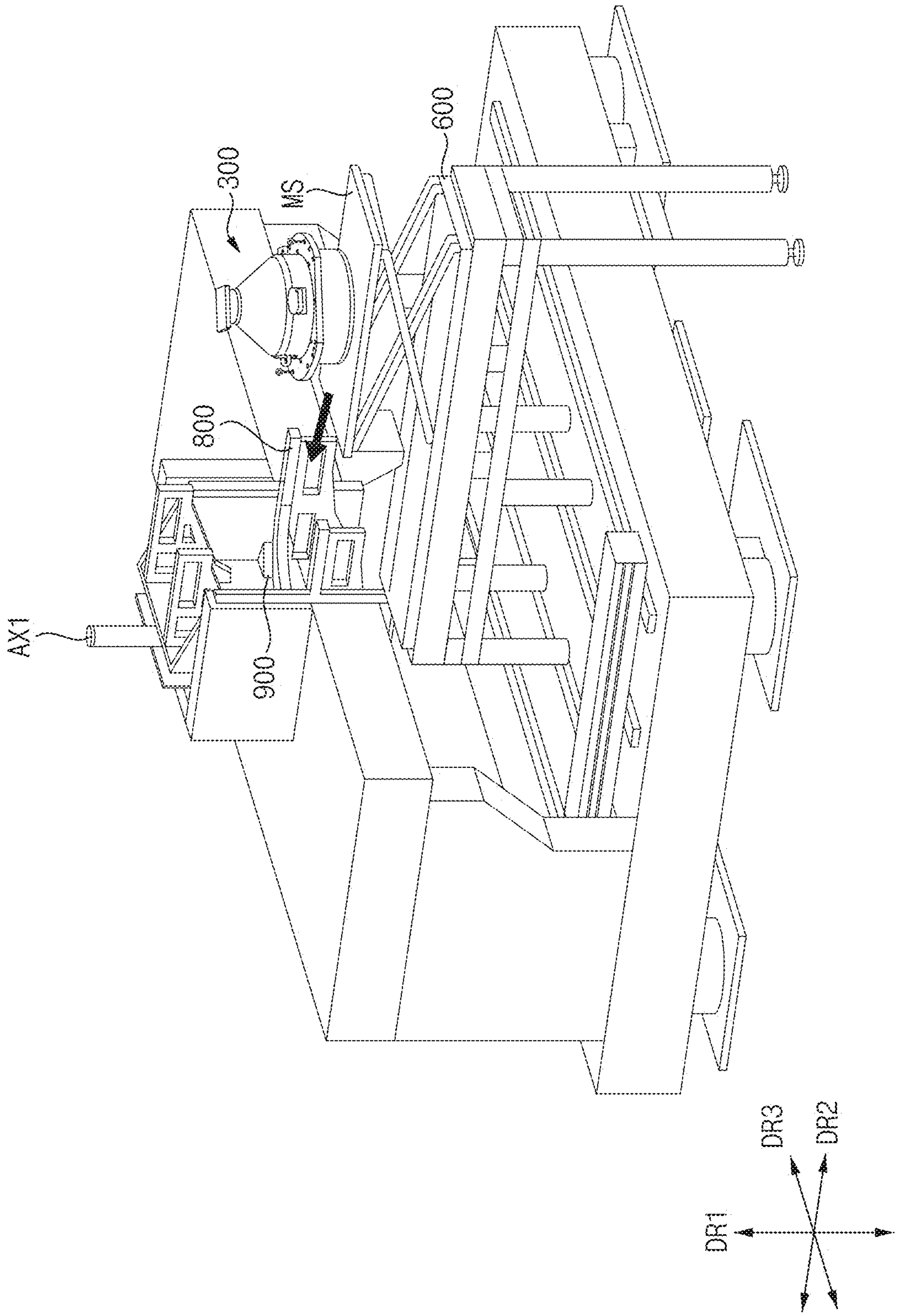
Figure 12:
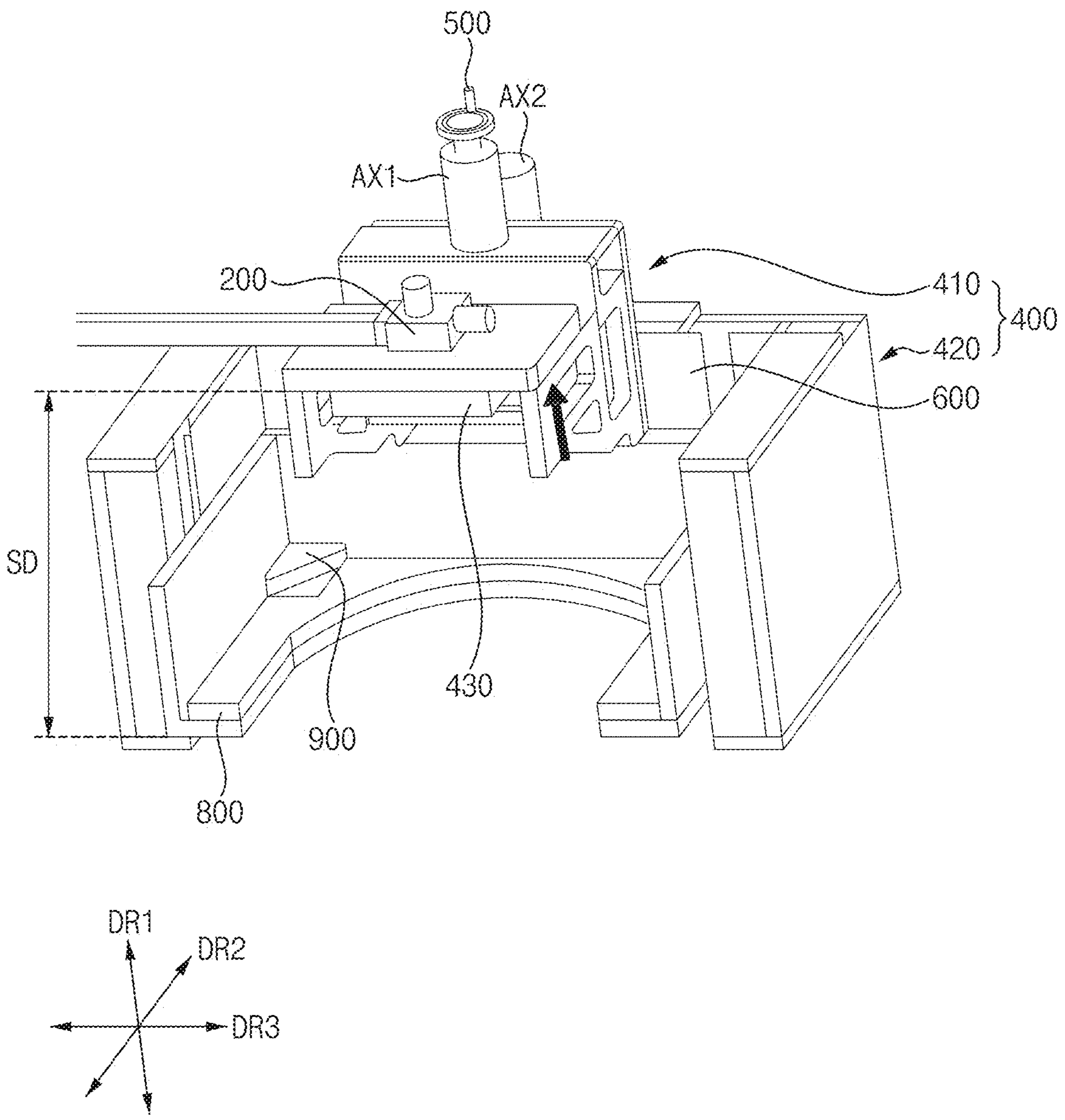

Referring to FIGS. 11 and 12, the lens module 300 may be disposed between the first adapter 410 and the second adapter 420 (S230). In an embodiment, first, the first adapter 410 may be moved to control the distance between the first adapter 410 and the second adapter 420 to have the first separation distance SD (S220) to dispose the lens module 300 therebetween.

A level of the first adapter 410 may be controlled first so that the lens module 300 does not interfere with the first adapter 410. As described above, in an embodiment, the scanner 200 may be connected to the first adapter 410, and when the first adapter 410 moves in the first direction DR1, the scanner 200 may move only in the first direction DR1. In an embodiment, the lens module may be connected to the second adapter 420, and when the second adapter 420 moves in the first direction DR1, only the lens module 300 may move in the first direction DR1.

The level of the first adaptor 410 may be controlled by the spacing control member 500. In an embodiment, for example, the spacing control member 500 may be THE jog dial. However, the disclosure is not limited thereto.

Next, the moving stage MS may be slid to position the lens module 300 between the first adapter 410 and the second adapter 420. As described above, the support member 800 may be disposed on the second adapter 420. Accordingly, the connecting part (e.g., the connecting part 330 of FIG. 6) of the lens module 300 may be supported by the support member 800.

As described above, the stopper 900 may be disposed on the side of the support member 800. When installing the lens module 300 between the first adapter 410 and the second adapter 420, the stopper 900 may be located near the end point of the path along which the lens module 300 moves.

Figure 13:
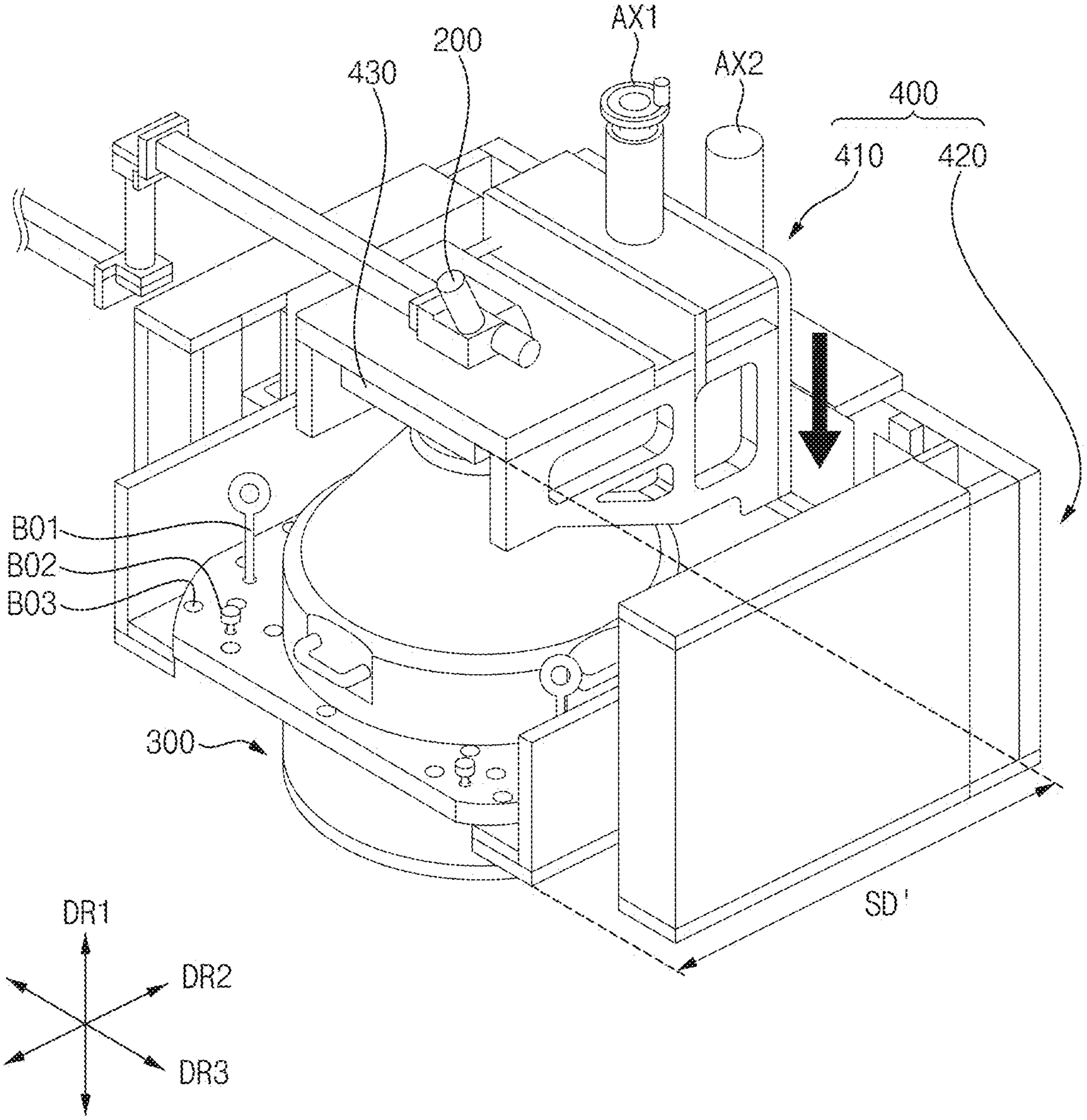

Referring to FIG. 13, an embodiment of the method may include controlling the gap between the first adaptor 410 and the second adaptor 420 to have the second separation distance SD' by moving the first adaptor 410 (S240), controlling the flatness of the lens module 300 (S250), and fixing the lens module 300 to each of the first adaptor 410 and the second adaptor 420 (S260). As described above, the second separation distance SD' of FIG. 13 may be smaller than the first separation distance SD of FIG. 12.

The level of the first adapter 410 may be re-controlled so that the lens module 300 may be adjacent to the first adapter 410. As described above, the level of the first adapter 410 may be controlled using the spacing control member 500.

In an embodiment, for example, an adapter may be additionally disposed between the lens module 300 and the first adapter 410. In an embodiment, as shown in FIG. 5, an additional adapter 400' including a third adapter 430 and a fourth adapter 440 may be further disposed between the scanner 200 and the lens module 300.

Referring to FIGS. 5 and 13, for example, along the path of the laser beam (e.g., the laser beam LB of FIG. 1), the scanner 200, the first adapter 410, the third adapter 430, the fourth adapter 440, and the lens module 300 may be arranged sequentially. However, the disclosure is not limited thereto. In an embodiment, for example, the additional adapter may be omitted or have a different form.

After controlling the second separation distance SD' (S240), the flatness of the lens module 300 may be controlled (S250). In an embodiment, the flatness may be controlled using the second connector BO2.

After controlling the flatness of the lens module 300 (S250), the lens module 300 may be fixed to each of the first adapter 410 and the second adapter 420 (S260). In an embodiment, the lens module 300 may be fixed by the third connector BO3.

In an embodiment, the first connector BO1 that moves the lens module 300, the second connector BO2 that controls the flatness of the lens module 300, and the third connector that fixes the lens module 300. The third connector BO3 may be positioned point symmetrically. However, the disclosure is not limited thereto.

Figure 14:
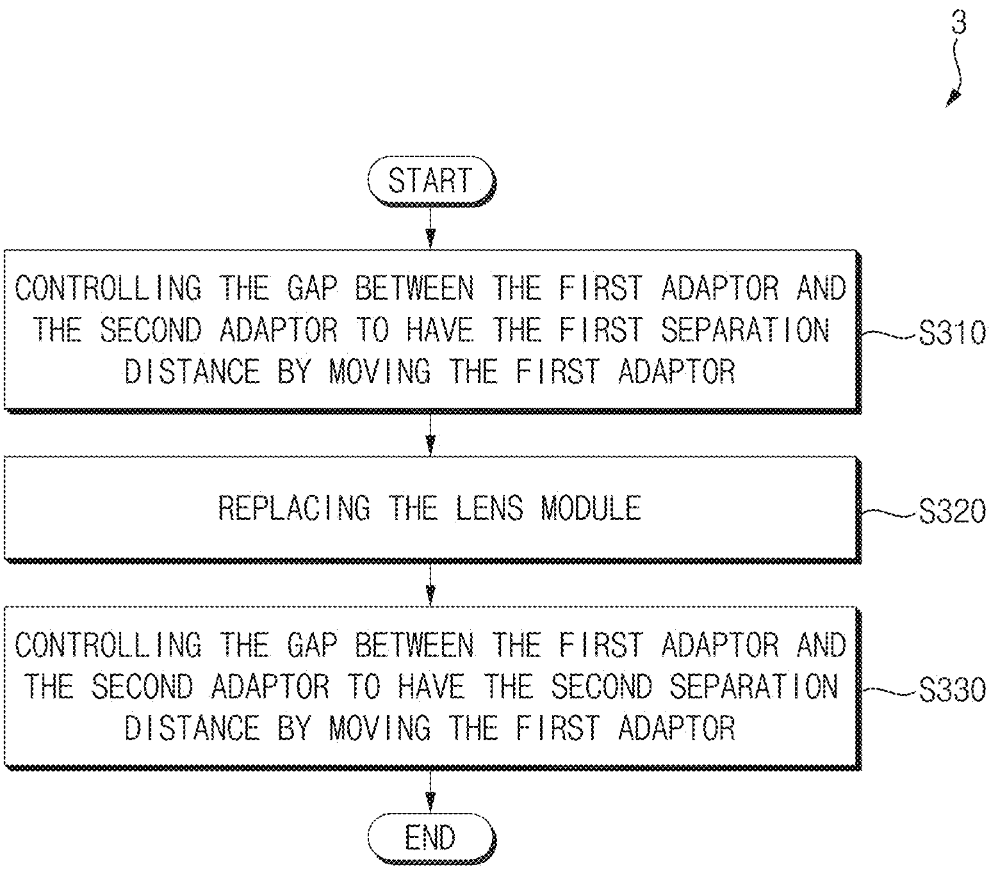
FIG. 14 is a flowchart illustrating a method of replacing the lens module in the laser device according to an embodiment of the disclosure.
Figure 15:
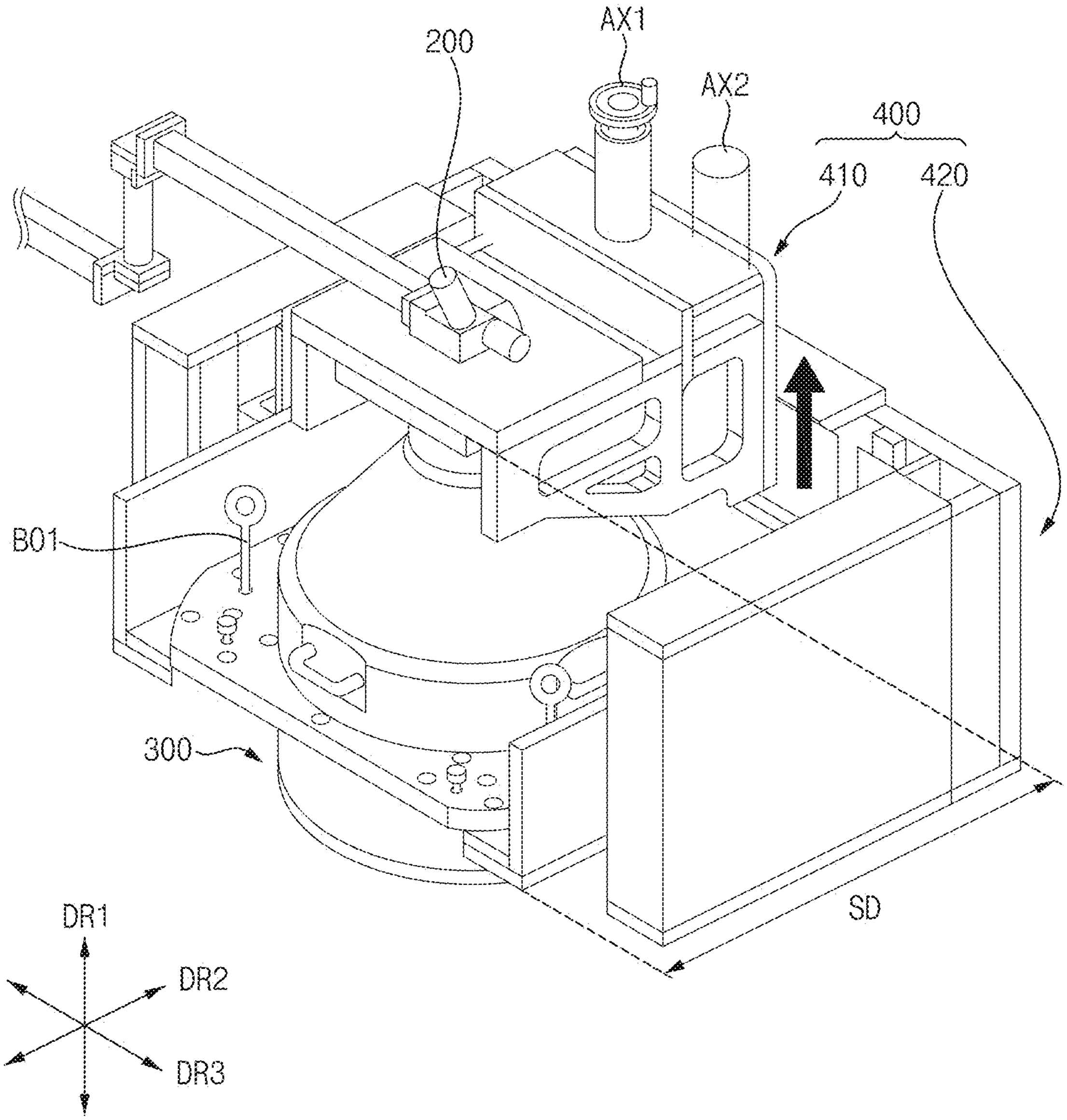
FIGS. 15 and 16 are views illustrating the method of replacing the lens module in the laser device of FIG. 14.
Figure 16:
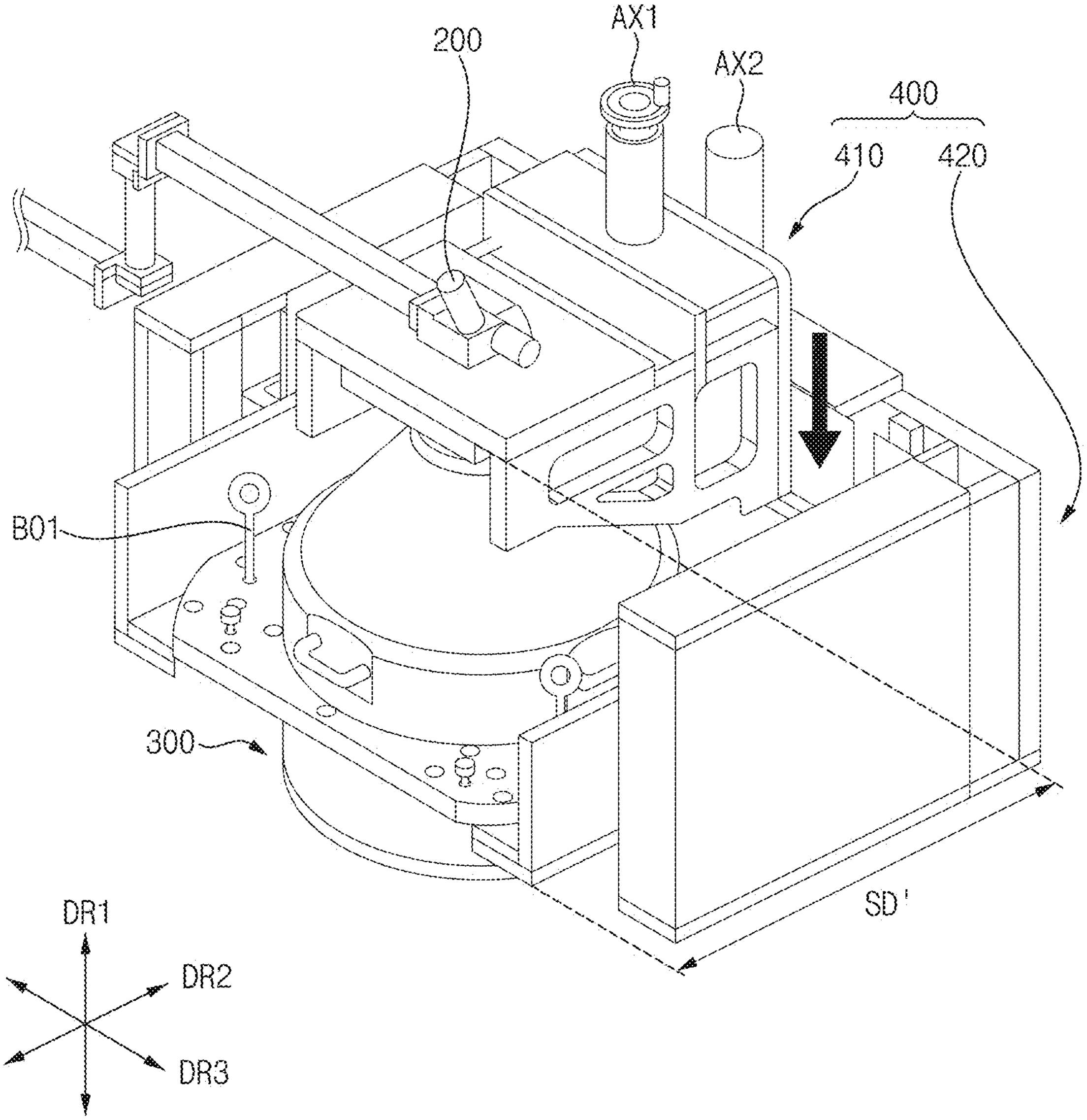

FIG. 14 is a flowchart illustrating a method of replacing the lens module in the laser device according to an embodiment of the disclosure. FIGS. 15 and 16 are views illustrating the method of replacing the lens module in the laser device of FIG. 14.

Referring to FIG. 14, a method 3 of replacing the lens module included in the laser device (e.g., the lens module 300 included in the laser device 1 of FIG. 1) according to an embodiment of the disclosure may include controlling the gap between the first adaptor (e.g., the first adaptor 410 of FIG. 1) and the second adaptor (e.g., the second adaptor 420 of FIG. 1) to have the first separation distance SD by moving the first adaptor (S310), replacing the lens module (S320), and controlling the gap between the first adaptor and the second adaptor to have the second separation distance SD' by moving the first adaptor (S330).

Referring to FIGS. 15 and 16, as described above, in an embodiment, the scanner 200 may be connected to the first adapter 410, and when the first adapter 410 moves in the first direction DR1, only the scanner 200 may move in the first direction DR1, the lens module may be connected to the second adapter 420, when the second adapter 420 moves in the first direction DR1, only the lens module 300 may move in the first direction DR1.

Therefore, when replacing the scanner 200, only the scanner 200 may be replaced by separating the scanner 200 from the first adapter 410 while the lens module 300 is fastened to the second adapter 420.

In addition, each of the first adapter 410 and the second adapter 420 may move in the first direction DR1.

Therefore, when the gap between the first adaptor 410 and the second adaptor 420 has the first separation distance SD by moving the first adaptor 410 along the direction opposite to the gravity direction and the second adaptor 420 along the gravity direction, only the lens module 300 may be separated and replaced while the scanner 200 is fasted to the first adaptor 410.

In an embodiment, as described above, when replacing the lens module 300, the first adapter 410 and the second adapter 420 may be moved together and the separation distance (e.g., the first separation distance SD or the second separation distance SD') may be controlled. However, the disclosure is not limited thereto. In an embodiment, for example, the separation distance may be controlled by moving only the first adapter 410 or only the second adapter 420.

Embodiments of the invention may be applied to a manufacturing process of a display device and an electronic device including the display device such as computers, notebooks, cell phones, smart phones, smart pads, portable media players ("PMPs"), personal digital assistants ("PDAs"), moving picture experts group audio layer 3 ("MP3") players, and/or the like, for example.

Embodiments of the disclosure should not be construed as being limited to the embodiments set forth herein. Rather, these embodiments are provided so that this disclosure will be thorough and complete and will fully convey the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims. Therefore, it is to be understood that the foregoing is illustrative of various embodiments and is not to be construed as limited to the illustrative embodiments disclosed, and that modifications to the disclosed embodiments, as well as other embodiments, are intended to be included within the scope of the appended claims. Moreover, the embodiments or parts of the embodiments may be combined in whole or in part without departing from the scope of the invention.

What is claimed is:

1. A laser device comprising:
a laser source which emits a laser beam;
a scanner located on a path of the laser beam emitted from the laser source, wherein the scanner controls the path of the laser beam;
a lens module located on a path of a controlled laser beam, wherein the lens module converges the laser beam; and
a lens adaptor connecting the lens module to the scanner, and
wherein the lens module comprising:
a first lens part which accommodates a first lens;
a second lens part which accommodates a second lens; and
a connecting part located between the first lens part and the second lens part,
wherein the connecting part has a longest diameter greater than a longest diameter of the first lens part and a longest diameter of the second lens part.

2. The laser device of claim 1, wherein a plurality of first holes and a plurality of second holes spaced apart from the first holes are defined in the connecting part.

3. The laser device of claim 2, further comprising:
a first connector fastened to each of the plurality of first holes, wherein the first connector includes a ring part.

4. The laser device of claim 2, further comprising:
a second connector fastened to each of the plurality of second holes, wherein the second connector controls a flatness of the lens module.

5. The laser device of claim 1, wherein the lens adaptor comprises:
a first adaptor movable in a first direction along a first axis; and
a second adaptor movable in the first direction along a second axis parallel to the first axis, wherein a gap between the first adaptor and the second adaptor is controlled,
wherein the lens module is disposed between the first adaptor and the second adaptor.

6. The laser device of claim 5, further comprising:
a spacing control member connected to the first axis, and
wherein the spacing control member moves the first adaptor in the first direction based on at least one operating direction thereof.

7. The laser device of claim 5, further comprising:
a linear moving member installed on the second adaptor in a direction parallel to the second axis, and
wherein the second adaptor moves in the first direction along the linear moving member.

8. The laser device of claim 5, further comprising:
a support member disposed on the second adaptor, and
wherein the connecting part of the lens module is seated on the support member.

9. The laser device of claim 8, further comprising:
a stopper disposed on a side of the support member, and
wherein the stopper limits a movement of the lens module in a second direction crossing the first direction.

10. The laser device of claim 5, wherein,
the scanner is connected to the first adaptor,
when the first adaptor moves in the first direction, only the scanner moves in the first direction,
the lens module is connected to the second adaptor, and
when the second adaptor moves in the first direction, only the lens module moves in the first direction.

11. A laser device comprising:
a laser source which emits a laser beam;
a scanner located on a path of the laser beam emitted from the laser source, wherein the scanner controls the path of the laser beam;
a lens module located on a path of a controlled laser beam, wherein the lens module converges the laser beam; and
a lens adaptor connected to the scanner, wherein the lens adaptor accommodates the lens module, and
wherein the lens adaptor comprising:
a first adaptor movable in a first direction along a first axis; and
a second adaptor movable in the first direction along a second axis parallel to the first axis, wherein a gap between the first adaptor and the second adaptor is controlled.

12. The laser device of claim 11, further comprising:
a spacing control member connected to the first axis, and
wherein the spacing control member moves the first adaptor in the first direction based on at least one operating direction thereof.

13. The laser device of claim 11, further comprising:
a linear moving member installed on the second adaptor in a direction parallel to the second axis, and wherein the second adaptor moves in the first direction along the linear moving member.

14. The laser device of claim 11, wherein the lens module comprises:

a first lens part which accommodates a first lens;

a second lens part which accommodates a second lens; and a connecting part located between the first lens part and the second lens part, wherein the connecting part has a longest diameter greater than a longest diameter of the first lens part and a longest diameter of the second lens part.

15. The laser device of claim 14, wherein a plurality of first holes and a plurality of second holes spaced apart from the first holes are defined in the connecting part.

16. The laser device of claim 15, further comprising:

a first connector fastened to each of the plurality of first holes, wherein the first connector includes a ring part.

17. The laser device of claim 15, further comprising:

a second connector fastened to each of the plurality of second holes, wherein the second connector controls a flatness of the lens module.

18. The laser device of claim 14, further comprising:

a support member disposed on the second adaptor, and wherein the connecting part of the lens module is seated on the support member.

19. The laser device of claim 18, further comprising:

a stopper disposed on a side of the support member, and wherein the stopper limits a movement of the lens module in a second direction crossing the first direction.

20. The laser device of claim 11, wherein, the scanner is connected to the first adaptor, when the first adaptor moves in the first direction, only the scanner moves in the first direction, the lens module is connected to the second adaptor, and when the second adaptor moves in the first direction, only the lens module moves in the first direction.

* * * * *